Dec. 11, 1962 T. G. KIRKLAND 3,068,091
PROCESS FOR THE DIRECT REDUCTION OF OXIDIC ORES
Filed Nov. 1, 1960 2 Sheets-Sheet 1
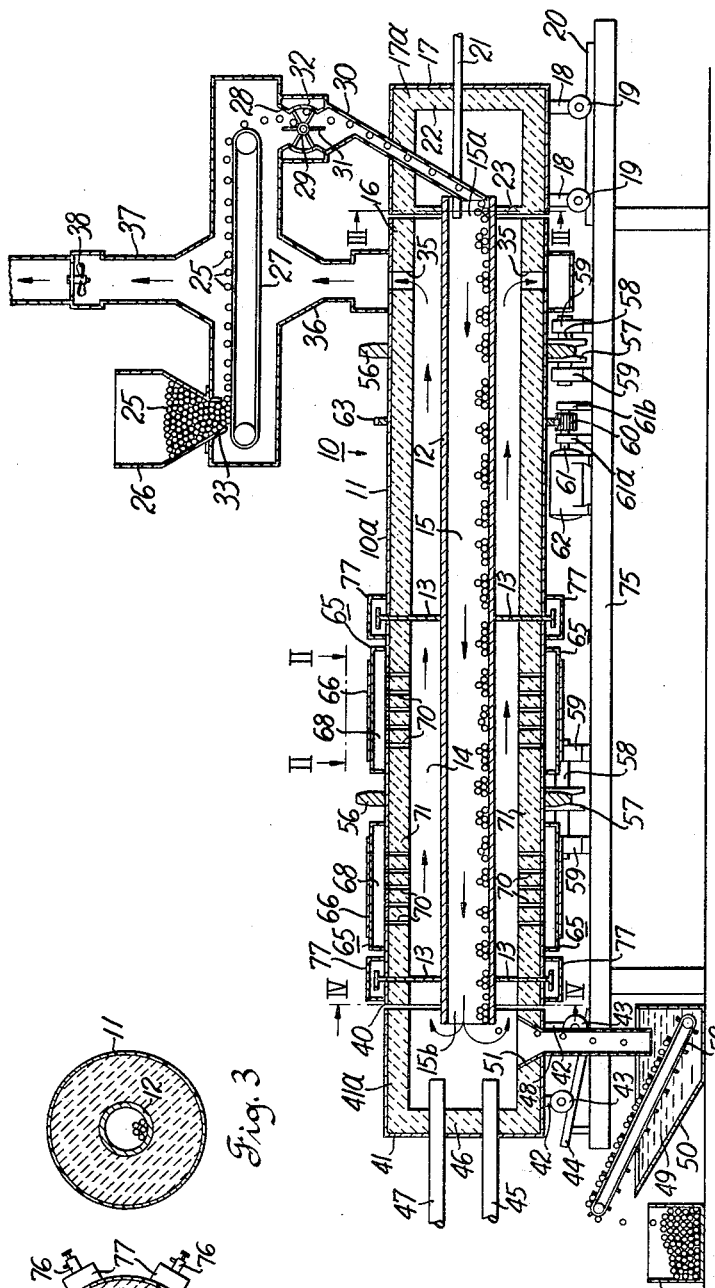
Inventor
Terence G. Kirkland
by Richard R. Mybeck
Attorney

United States Patent Office 3,068,091
Patented Dec. 11, 1962

3,068,091
PROCESS FOR THE DIRECT REDUCTION OF OXIDIC ORES
Terence G. Kirkland, Milwaukee, Wis., assignor to Allis-Chalmers Manufacturing Company, Milwaukee, Wis.
Filed Nov. 1, 1960, Ser. No. 66,612
12 Claims. (Cl. 75—36)

The present invention relates generally to the manufacture of metals which occur in nature as highly oxidic ores such, for example, as iron, tungsten, nickel, zinc and certain forms of copper; and more particularly to a method of producing these metals by the direct reduction of the oxidic ore concentrates.

Typical of the ore concentrates whose treatment is hereby contemplated are the extensive taconite deposits of the Mesabi Range and the jasper deposits of upper Michigan.

Many problems have been encountered in the various attempts by the prior art to achieve the direct reduction of oxidic ores such, for example, as the iron ores above mentioned.

One approach heretofore attempted without any great measure of success involved the utilization of the higher aliphatic hydrocarbons and metallurgical coke as reducing media with specially selected catalysts. This approach was never fully accepted because the required catalyst had a tendency to introduce foreign materials into the product and further reduce the working capacity of the furnace while the hydrocarbons caused intense carbon deposits to form upon the ore and catalyst thereby forming a barrier coating which "protected" the ore from reduction and choked off the effectiveness of the catalyst whereupon the reduction process was rendered quite imperfect.

The present invention is based upon the discovery that higher carbon aliphatic hydrocarbon compounds such as propane, etc., can be utilized with a great success in direct reduction of high grade oxidic ores when employed in the unique manner and with the strategic zone arrangement to be hereinafter described in detail. When used in the manner to be described, the requirement of adding auxiliary catalysts is obviated.

Another important feature of the present invention is predicated upon my discovery that the utilization of an underburned hydrocarbon in a reducing zone with a controlled amount of air will permit the amount of carbon in the ore charge to be regulated sufficiently well to control the carbon content, and hence the physical properties of the final product produced thereby.

Another important feature of the present invention is the utilization of the oxidic ore itself as the catalyst for the disassociation and reformation of the propane-type fuel thereby completely obviating the need for charging auxiliary catalysts into the system.

Essentially, therefore, the present invention provides a process for the direct reduction of oxidic ores such, for example, as the iron oxides indicated, which includes: passing an underburned gaseous fuel over an oxidic ore disposed in a heated reducing zone in such a manner that most of the gaseous fuel is reformed by the synergistic coaction of the heat and the ore charge itself to provide a reducing atmosphere capable of removing approximately 98 percent of the oxygen from the ore charge while simultaneously controlling the carbon content of the product, subsequently passing the reducing gases from the reducing zone into and through a combustion zone disposed concentrically with the reducing zone; and thereafter burning the reducing gases in the combustion zone with aspirated air to provide a controlled temperature throughout a controllable length of the zone to strategically heat the reducing zone disposed therewithin.

Thus, simplified, the process, as shall be hereinafter described in detail, is found to fulfill the following objects:

First, and one of the primary objects of the present invention is to provide a process for the direct reduction of oxidic ores in which the reducing atmosphere is generated within the actual reducing zone by the reformation of high aliphatic hydrocarbons in response to the synergistic coaction of a controlled temperature and the oxidic ore charge whereby the external gas reformers and special catalysts, heretofore deemed necessary for such processes, are completely eliminated.

Another object of the present invention is to provide a process for the direct reduction of oxidic ores in which concentric reduction and combustion zones are so employed that reducing gases generated and maintained within the reducing zone are controllably passable into the combustion zone for combustion therein.

Another object is to provide an improved process for the direct reduction of oxidic ores in which gases passing from the reducing zone are admixed with air at strategic points within a combustion zone disposed concentrically with the reducing zone to provide exact control of the temperature throughout the length of the reducing zone.

Still another object of the present invention is the provision of improved methods and apparatus for the direct reduction of oxidic ores wherein the reducing zone for oxidic ores is able to extend the complete length of the apparatus whereupon maximum effectiveness is realizable for a given installation in a given amount of space.

Another important object of the present invention is to provide an improved process for the direct reduction of oxidic ores in which fuel gases of the aliphatic hydrocarbon type are used to a maximum efficiency by first reforming the gases directly over and with the oxidic ore to be reduced and thereafter burning the same gases in a combustion zone concentric to but physically separated from that reducing zone whereby the desired temperature characteristic of the reducing zone is maintained.

Another important object of the present invention is to provide an improved design for apparatus for use in the direct reduction of oxidic ores which permits the efficient utilization of hydrocarbon fuels, both as a reducing media for the oxidic ores and thereafter as the sole source of heat effecting the thermal and catalytic reformation of the gases in the reducing zone and to maintain said reducing zone at a readily controlled temperature.

Still another important object is to provide a method of directly reducing oxidic ores in which any liquid or gaseous hydrocarbon fuel may be used and the use of metallurgical coke, heretofore required for such processes, may be substantially completely eliminated Another important object of the present invention is to provide a method of directly reducing oxidic ores in which the raw material does not need to be heat hardened prior to its introduction into the process.

Still another object of the present invention is to provide a method of direct reducing oxidic ores in which the product produced thereby is suitable as discharged therefrom for use in a melting furnace or cupola without any subsequent treatment.

Another object of the present invention is to provide a method for directly reducing oxidic ores into a product which is nonpyrophoric.

Still another object of the present invention is to provide a method of directly reducing oxidic ores which may be practiced in existing concentration plants and foundries.

Still another object of the present invention is the provision of an improved method for handling high grade concentrates which lends itself to the introduction of alloying metals whereby the product pellets may be self-contained for melting to produce alloyed steel products.

These and still further objects, as shall hereinafter appear, are fulfilled by the present invention to a remarkably unexpected extent as shall be readily discerned from the following detailed description of exemplary embodiments of the present invention, especially when considered in conjunction with the attached drawings in which:

FIG. 1 is a partially schematic elevation of apparatus of a type upon which the present invention may be practiced;

FIG. 2 is a plan view of a manifold of the apparatus of FIG. 1 at II—II;

FIG. 3 is a cross sectional view of the apparatus of FIG. 1 taken across line III—III;

FIG. 4 is a cross sectional view of the apparatus of FIG. 1 taken across line IV—IV.

Figure 5:
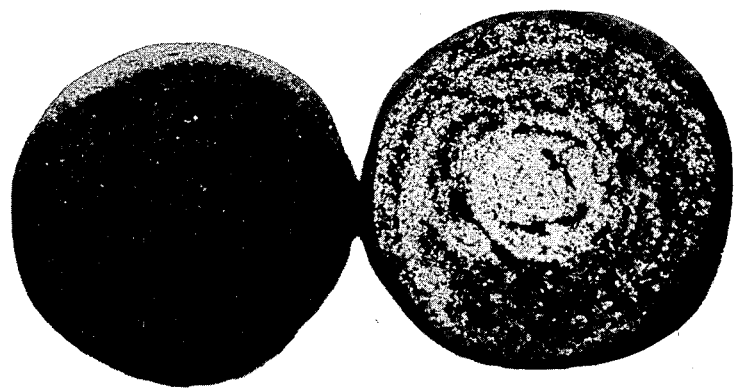
FIG. 5 is a photomicrograph showing a pellet before and a pellet after it has been treated according to the present invention.

Referring to FIG. 1 of the drawings wherein suitable apparatus for the practice of the present invention is identified by the general reference numeral 10 and comprises a body portion 10a having an outer cylindrical shell 11 and an inner cylindrical shell 12 effectively suspended from shell 11 by suitable supports 13 and defines therewith an annulus 14 therebetween. The inner shell 12, or tube as it shall be hereinafter called, circumscribes and defines a generally cylindrical opening, herein called reducing zone 15, while outer shell 11 circumscribes tube 12 and defines therebetween the annulus 14, herein called burning or combustion zone 14.

Adjacent one end 16 of body portion 10a and cooperating therewith is a feed hood 17 lined with a suitable refractory 17a and mounted in the conventional fashion upon a plurality of legs 18, each having a grooved wheel 19 suitably guided by track 20 to permit the axial movement of hood 17 during the heating cycle.

Inlet means 21 are disposed in back wall 22 through lining 17a of feed hood 17 for the passage of a fuel (preferably, as shall later appear, of either a gaseous or atomized liquid type) from a suitable source (not shown) into the reducing zone 15. The passage of the fuel into annulus 14 is effectively precluded by a suitable seal 23 carried by hood 17 and disposed in sealing engagement with tube 12 (see FIG. 3).

The oxidic ore is fed into tube 12 by a feed system which shall now be described.

Raw material, preferably in the form of pellets 25, using a suitable balling pan or like apparatus (not shown), is contained in a hopper 26 from which it is fed, as by gravity, through a suitable adjustable discharge gate valve 33 onto power driven drying grate 27 which transports the pellets 25 horizontally and discharges the pellets through a tapered chute 28 into a gate feeder 29 which permits entry of the pellets into a sealed feed chute 30 and hence into reducing zone 15.

Gate feeder 29 is of the sealed type comprising a plurality of surface engaging vanes 31 operating in a generally cylindrical chamber 32 and is already well known. Other suitable sealed feeders may be employed within the scope of the present invention.

Drying grate 27 is disposed vertically above in such a position that the gases passing out of combustion zone 14 through discharge ports 35 are drawn up hood 36 through grate 27 and the material 25 disposed thereupon to dry the material and carry its moisture up and out of stack 37 in response to the suction of fan 38.

Adjacent the other end 40 of body portion 10a is cooperatively disposed a discharge hood 41 likewise lined with a suitable refractory 41a and similarly mounted in the conventional fashion upon a plurality of legs 42, each having a grooved wheel 43 secured thereto and guided by inclined track 44 to permit axial movement of hood 41 during the heating cycle.

Inlet means 45 are disposed in back wall 46 of hood 41 as a standby device to permit the introduction of secondary air thereinto if and when it is desired. Additional standby equipment in the form of a burner 47, the function of which shall be hereinafter described, is also disposed through back wall 46.

As is now apparent, hoods 17, 41 are segmented relative to body portion 10a and are equipped for axial movement relative to body portion 10a in the fashion described. The hoods 17, 41, however, do not rotate while the preferred embodiment of body portion 10a is equipped for rotation as shall appear.

In hood 41 a discharge pipe 48 is disposed beneath the discharge edge of tube 12 and extends downwardly through lining 41a into a sealed engagement with a suitable cooler, created, for example, as a liquid seal, beneath the surface of the suitable liquid coolant, such as water 49, contained by the cooler or coolant tank 50. Processed pellets (see FIG. 5) discharging out of reducing zone 15 of tube 12 fall into discharge pipe 48, through tapered mouth 51, and are guided into the coolant 49 where they are quenched and cooled. The cooled pellets may then be removed from the cooler 50 by any suitable means such, for example, as power driven belt 52 which carries the cool pellets out of tank 50 and discharges them into a suitable storage compartment 53. For clearance purposes, belt 52 and track 44 are provided with substantially the same inclination.

As mentioned previously, body portion is, in its preferred form, as shown in FIG. 1, rotatable and carried by suitable support rings 56 which ride upon support rollers 57 in the conventional fashion. Each support roller 57 is mounted on a shaft 58 extending from a suitable bearing mount 59 which is mounted to and carried by a suitable support structure 75.

One suitable means for rotating body portion 10a comprises a driving pinion 60 mounted between suitable bearings 61a, 61b, upon the shaft 61 of a motor 62 whereupon, in response to the driving force of the motor, pinion 60 drives a ring gear 63 which is meshed with the pinion 60 and secured to body portion 10a. Motor 62 and bearings 61a, 61b are also mounted to and carried by support structure 75.

Referring again to FIG. 1, a plurality of secondary air manifolds 65 are operatively disposed about the periphery of shell 11. Each manifold 65 permits the controlled introduction of secondary air into combustion zone 14 through controllable air inlet means such as a hand valve or a sliding valve 66 (shown in FIG. 2), depending upon the desires of a particular operator. A suitable valving arrangement is shown in FIG. 2 and comprises a valve frame 67 which is secured to shell 11 and defines therewith an air chamber 68. The upper surface of the frame 67 contains a plurality of apertures 69 to permit communication between the atmosphere and air chamber 68. Air chamber 68 is likewise communicative with combustion zone 14 through a plurality of holes 70 defined radially through shell 11 and its refractory lining 71.

On top of valve frame 67 and riding in a suitable slide 72 defined thereby is a slidable plate 73 having a plurality of apertures 74 defined therethrough. Axial actuation of plate 73 in slide 72 effects relative movement between apertures 69 and apertures 74 whereby the passage of air from the atmosphere to the air chamber and hence to the combustion zone is readily controlled and reflects the amount of registry between the two series of apertures 69, 74.

Each of the several manifolds 65 is constructed in a like manner whereupon the total air intake by the combustion zone and the amount of air available for various portions of the zone (which permits temperature control) is readily controlled by a simple adjustment of each of the several manifolds.

Air is drawn into the combustion zone in response to the suction placed upon the system by fan 38 in the same manner it draws all gases through the system.

One practice of the present invention, as it would be performed with the above apparatus using an oxidic iron ore as raw material, shall now be described.

The oxidic ore is processed into pellet form according to well known practice and stored in hopper 26.

The apparatus, without material, is started by passing a primary fuel such, for example, as propane, through fuel inlet 21 into reducing zone 15.

During this preliminary period, sufficient oxygen to support the combustion of the fuel is mixed with the fuel externally of the device and the fuel-oxidant mixture emitting from inlet 21 is ignited. The fuel is burned until the reducing zone reaches a temperature sufficient to effect the reformation of the fuel, that is, about 1200° F., as indicated by suitable thermocouples or like indicators, whereupon the oxidant in the mix is shut off. The reducing zone is now ready for the introduction of the oxidic ore thereinto.

After the desired temperature is reached and the supply of oxidant is discontinued, the flow of unburned or raw gas into reducing zone 15 is continued. The reducing zone 15 is preferably maintained at a temperature of at least 1200° F. although it is operative at temperatures of about 1100° F. as shall hereinafter be described.

The flow of gases during preheat as well as during operation is effected by the actuation of fan 38 which draws the gases through the system in the path indicated by the arrows in FIG. 1.

The oxide pellets such, for example, as taconite are stored in hopper 26 and then moved into the system by opening of gate valve 33 and actuating grate 27 whereupon the pellets 25 are disposed upon grate 27 and transported transversely through the flow of heated gases up through hood 36 to stack 37. The heated gases dry and preheat the pellets which are dropped off of grate 27 in a tapered chute 28 which directs the preheated pellets into the chamber 32 of gate feeder 29. The pellets are moved through the gate feeder 29 into sealed feed chute 30 by the action of vanes 31 on the wall of chamber 32.

The oxide pellets pass through feed chute 30 into the reducing zone 15 where they are moved and tumbled through the length of this zone in response to the rotation of body portion 10a and slight inclination of shell 12 relative to the horizontal.

For purposes of the further description, reducing zone 15 will be considered to consist of two portions, viz., a feed portion 15a adjacent feed hood 17 and a discharge portion 15b adjacent discharge hood 41, each of said portions extending axially of tube 12 to the other.

For the practice being described, feed portion 15a is maintained at a temperature of about 1200° F. as indicated while the discharge portion 15b is maintained at about 1900 to 1950° F. by the action of the manifolds 65 providing additional oxidant to the heated fuel. These temperatures are selected to achieve sufficient speed of reaction to provide a commercially practical output of material. The reaction will occur, but will require a longer cycle time, at a temperature of about 1100° F. in both portions 15a and 15b provided the temperature at least exceeds the equilibrium temperature of the oxide being treated.

The primary fuel, upon engaging pellets 25 in the heated feed portion 15a of reducing zone 15, is partially decomposed and reformed by the coaction of the heat and the catalytic action of the oxidic ore. The partially decomposed and reformed gas thereby provides a strong reducing atmosphere throughout the reducing zone 15. This reducing atmosphere substantially completely removes all (about 95 to 98 percent) of the oxide contained in the ore. Simultaneously, the decomposing gas does not disturb the carbon in the pellets so that an easily workable product may be produced (by providing the proper amount of carbon to achieve workability) for discharge from shell 11 into the cooler.

The gases, upon passing out of the reducing zone 15 in the practice described, are at a temperature of about 1950° F. The gases then flow into annulus or burning zone 14 where they are mixed with a controlled amount of secondary air entering through manifolds 65 and ignite. The burning gases then pass through burning zone 14, which is concentric with the reducing zone 15, and provide heat which radiates through shell 12 into the reducing zone 15. The temperature in the burning zone 14, and hence in reducing zone 15, is controlled by regulating the amount of secondary air entering burning zone 14 through manifolds 65. This control of the temperature along the entire length of the annular burning zone is quite precise and desired operating conditions are readily effected. For ease of illustration, manifolds 65 are only shown about portion 15b of the reducing zone although they may of course be disposed about portion 15a when warranted. The flow of burned gases from the burning zone 14 back into the reducing zone 15 at the feed hood end is, of course, also prevented by seal 23.

If the process is to be practiced in an extremely cold climate, or if, for some other reason, it is determined that still additional heat is desired, additional fuel may be fed to the system through standby burner 47 and additional secondary air may be supplied through standby air inlet 45.

The burned gases from burning zone 14 are next drawn through annulus 14 to exhaust ports 35, which extend through lining 71, and up through hood 36 and stack 37 by fan 38. Fan 38, as previously indicated, also provides suction for drawing air in through the manifolds 65.

En route to the fan 38 the burned gases, at a temperature of about 600° F., pass through the pellets 25 on grate 27 to dry and preheat these pellets. By the time the gases reach exhaust, their temperature is usually reduced to about 250° F. or less so that no great heat loss occurs from releasing the gases to the atmosphere. Dust content in these gases does not seem to be a problem but, should it arise, a dust collector may be connected in series with stack 37.

The material discharging from reducing zone 15, which is now substantially completely deoxidized, is dropped through discharge pipe 48 into the coolant 49 in cooler 50. Where water or like coolant is employed, a light oxide coating will form on the heated pellets as they hit the water. This coating performs the highly desirable function of rendering the pellets completely non-pyrophoric which is extremely advantageous when the present invention is practiced some distance from the melting furnaces and transporting of pellets is required. When the present invention is practiced in close proximity to the melting furnaces and can be fed into the furnaces as they are discharged from this system, the step of forming the light oxide coating may be omitted.

As previously mentioned, manifolds 65 aspirate secondary air into the annulus 14 formed between the refractory brick lining 71 of outer shell 11 and the inner shell 12. Similar to manifolds 65 are support housings 77 which likewise are located strategically along the outer surface of shell 11 in a covering relationship to the protruding portions of supports 13. Each housing 77 includes a suitable valve 76 similar to valve 66. In addition to providing the fire in the burning zone with secondary air, housings 77 perform the further function of air cooling supports 13, thereby serving to maintain at an essentially minimal level the thermal distortion which would otherwise occur. Normally, valves 76 will be provided with a fixed preselected opening and the variation of secondary air flow will be effected by the adjustment of valves 66.

Let use reconsider the flow of the material through the system.

The feed, delivered into reduction zone 15 in the manner described, encounters the reducing atmosphere which completely reduces the oxidic ore to the metallic constituent. The tumbling action imparted to the pellets by rotating body portion 10a insures uniform heating of the pellets as well as total engagement between the pellets and the atmosphere.

The metallic product passing from the reducing zones passes through a sealed discharge pipe 48 into the cooler 50 where it is quenched and from which it is removed as by conveyer 52 for transport to a storage compartment 53.

The gas flow through the system shall now be considered by itself.

A suitable hydrocarbon fuel, such as propane, is fed into feed hood 17 through inlet 21 and drawn through reduction zone 15 by the draw of fan 38.

Propane has been used because of its desirable characteristics of liquefaction although other gaseous or liquid fuels have been found quite suitable as will hereinafter appear.

The fuel flows through reduction zone 15 in the inner cylinder 12 and engages the tumbling oxidic ore. Under the influence of the heat radiating from the annular burning zone 14, which circumscribes reducing zone 15 and provides a temperature characteristic of about 1200° F. in the feed portion 15a thereof, the hydrocarbon fuel employs the oxidic ore flow as a catalyst whereupon the hydrocarbons reform into an atmosphere consisting primarily of hydrogen and carbon monoxide. The iron oxide concentrates are reduced by this atmosphere primarily at the hotter or discharge portion 15b of the reducing zone. In a typical installation, this portion will extend about 13 feet back from the discharge end of the tube 12. The reducing oxide concentrates are, however, continually replenished so that no want of catalyst will occur. When the temperature of the portion 15b is maintained at about 1900 to 1950° F., an excellent production rate is obtained.

The reducing gases flowing from the reducing zone 15 are directed back through the annulus 14 where secondary air, aspirated through manifolds 65 into and with the gas, mixes therewith and the mixture ignites. The air addition to the annulus 14 is controlled in the manner indicated above so that the temperature and the location of the hot zone may be varied at will.

The completely burned gases then exhaust up through ports 35, hood 36, drying grate 27 and out the stack 37 in response to the fan 38.

If more heat is required than can be supplied by the unused reducing gases, and the occurrence of this possibility is generally remote, additional fuel may be added through burner 47 located in the discharge hood 41.

It is, of course, understood that oxidic iron ore has been described above to illustrate rather than limit the process of the present invention and its principles are equally applicable to the oxidic ores of tungsten, nickel and zinc. In addition, certain higher grade oxidic ores of copper may also be reduced with this process.

It is further understood that the foregoing reference to propane is likewise exemplary since the entire aliphatic family of hydrocarbon fuels has been found to provide satisfactory results. In this respect, therefore, methane, butane, ethane and the like may also be used.

It is still further to be noted that the heavier hydrocarbons such as diesel fuel, Bunker C oil, kerosene and the like also reform under the conditions specified and consequently may also be employed with this process.

From the foregoing it becomes apparent that an improved process for the direct reduction of oxidic ores has been disclosed predicated, among other things, upon the reforming of fuels directly in contact with the ore and which fulfills all of the aforestated objectives to a remarkably unexpected extent.

It is, of course, understood that the foregoing description is for the purpose of exemplifying the present invention rather than limiting it; such other modifications, applications and variations as may occur to the artisan confronted with this teaching being intended within the spirit of the present invention especially as it is defined by the scope of the claims appended hereto.

Having now particularly described and ascertained the nature of my said invention and the manner in which it is to be performed, I declare that what I claim is:

1. The method of preparing a nonpyrophoric charge for melting furnaces from oxidic ores comprising:
   (a) preheating a reducing zone to a temperature sufficient to effect the chemical reformation of a hydrocarbon fuel;
   (aa) rotating said reducing zone;
   (b) introducing preheated oxidic ore selected from the group consisting of the oxidic ores of iron, tungsten, nickel, zinc and copper into said rotating preheated reducing zone;
   (c) introducing said hydrocarbon fuel into said rotating preheated reducing zone in the absence of sufficient oxidant to support the combustion thereof;
   (d) admixing said ore and said fuel to react said ore with said fuel whereupon said fuel is thermally and catalytically reformed by the action of said ore in said heat and said ore is deoxidized by the action of said reformed fuel;
   (e) passing said fuel from said rotating reducing zone directly into a heating zone circumscribing and rotating with said reducing zone;
   (f) introducing secondary air into said rotating heating zone to ignite said fuel and support the combustion thereof in said heating zone, said combustion providing sufficient heat to maintain a portion of said reducing zone at a temperature above the equilibrium temperature of said oxidic ore;
   (g) passing burned gases from said rotating heating zone through a supply of oxidic ore to preheat and dry said ore for introduction into said rotating reducing zone;
   (h) discharging reduced ore from said rotating reducing zone;
   (i) quenching said discharged ore in a quenching agent; and
   (j) removing said quenched ore from said quenching agent.

2. The method of reducing oxidic ores comprising:
   (a) preheating a rotating reducing zone to a temperature sufficient to effect the chemical reformation of a hydrocarbon fuel;
   (b) introducing preheated oxidic ore selected from the group consisting of the oxidic ores of iron, tungsten, nickel, zinc and copper into said preheated reducing zone;
   (c) introducing said hydrocarbon fuel into said preheated reducing zone in the absence of sufficient oxidant to support the combustion thereof;
   (d) admixing said ore and said fuel to react said ore with said fuel whereupon said fuel is thermally and catalytically reformed by the action of said ore in said heat and said ore is deoxidized by the action of said reformed fuel;
   (e) passing said fuel from said reducing zone directly into a heating zone circumscribing and rotating with said reducing zone;
   (f) introducing secondary air into said heating zone to ignite said fuel and support the combustion thereof, said combustion providing sufficient heat to maintain a portion of said reducing zone at a temperature above the equilibrium temperature of said oxidic ore;
   (g) passing burned gases from said heating zone through a supply of oxidic ore to preheat and dry said ore for introduction into said reducing zone; and
   (h) discharging reduced ore from said reducing zone.

3. The method of reducing oxidic ores comprising:
   (a) preheating a roating reducing zone to a temperature of at least 1100° F.;

(b) introducing preheated oxidic ore selected from the group consisting of the oxidic ores of iron, tungsten, nickel, zinc and copper into said preheated reducing zone;

(c) introducing a hydrocarbon fuel into said preheated reducing zone in the absence of sufficient oxidant to support the combustion thereof;

(d) admixing said ore and said fuel to react said ore with said fuel whereupon said fuel is thermally and catalytically reformed by the action of said ore in said heat and said ore is deoxidized by the action of said reformed fuel;

(e) passing said fuel from said reducing zone directly into a heating zone circumscribing and rotating with said reducing zone;

(f) introducing secondary air into said heating zone to ignite said fuel and support the combustion thereof in said heating zone, said combustion providing sufficient heat to maintain said reducing zone at a temperature of at least 1100° F.;

(g) passing burned gases from said heating zone through a supply of oxidic ore to preheat and dry said ore for introduction into said reducing zone; and (h) discharging reduced ore from said reducing zone.

4. The method of reducing oxidic ores comprising:

(a) preheating a rotating reducing zone to a temperature of at least 1100° F.;

(b) introducing preheated oxidic ore of an element selected from the group consisting of iron, tungsten, nickel, zinc and copper into said preheated reducing zone;

(c) introducing a hydrocarbon fuel into said preheated reducing zone in the absence of sufficient oxidant to support the combustion thereof;

(d) admixing said ore and said fuel to react said ore with said fuel whereupon said fuel is thermally and catalytically reformed by the action of said ore in said heat and said ore is deoxidized by the action of said reformed fuel;

(e) passing said fuel from said reducing zone directly into a heating zone circumscribing and rotating with said reducing zone;

(f) introducing secondary air into said heating zone to ignite said fuel and support the combustion thereof in said heating zone, said combustion providing sufficient heat to maintain at least a portion of said reducing zone at a temperature above the equilibrium temperature of said oxidic ore;

(g) passing burned gases from said heating zone through a supply of oxidic ore to preheat and dry said ore for introduction into said reducing zone; and (h) discharging reduced ore from said reducing zone.

5. The method of reducing oxidic iron ores comprising:

(a) preheating a reducing zone to a temperature of about 1200° F.;

(b) introducing preheated oxidic iron ore selected from the group consisting of the oxidic ores of iron, tungsten, nickel, zinc and copper into said preheated reducing zone;

(c) introducing an aliphatic hydrocarbon fuel into said preheated reducing zone in the absence of sufficient oxidant to support the combustion thereof;

(d) admixing said ore and said fuel to react said ore with said fuel whereupon said fuel is thermally and catalytically reformed by the action of said ore in said heat and said ore is substantially reduced to elemental iron by the action of said reformed fuel;

(e) passing said fuel from said reducing zone directly into a heating zone circumscribing and rotatable with said reducing zone;

(f) introducing secondary air into said heating zone to ignite said fuel and support the combustion thereof in said heating zone, said combustion providing sufficient heat to maintain a portion of said reducing zone at a temperature of about 1900° F.;

(g) passing burned gases from said heating zone through a supply of oxidic iron ore to preheat and dry said ore for introduction into said reducing zone; and (h) discharging said iron from said reducing zone.

6. The method of reducing oxidic ores comprising:

(a) preheating a reducing zone to a temperature sufficient to effect the chemical reformation of a hydrocarbon fuel;

(b) introducing preheated oxidic ore selected from the group consisting of the oxidic ores of iron, tungsten, nickel, zinc and copper into said preheated reducing zone;

(c) introducing said hydrocarbon fuel into said preheated reducing zone in the absence of sufficient oxidant to support the combustion thereof;

(d) tumbling said ore in said fuel to react said ore with said fuel whereupon said fuel is thermally and catalytically reformed by the action of said ore in said heat and said ore is deoxidized by the action of said reformed fuel;

(e) passing said fuel from said reducing zone directly into a heating zone circumscribing and rotatable with said reducing zone;

(f) introducing secondary air into said heating zone to ignite said fuel and support the combustion thereof in said heating zone, said combustion providing sufficient heat to maintain a portion of said reducing zone at a temperature above the equilibrium temperature of said oxidic ore;

(g) passing burned gases from said heating zone through a supply of oxidic ore to preheat and dry said ore for introduction into said reducing zone; and (h) discharging reduced ore from said reducing zone.

7. The method of reducing oxidic ores comprising:

(a) preheating a reducing zone to a temperature sufficient to effect the chemical reformation of a hydrocarbon fuel selected from the group consisting of aliphatic hydrocarbons, diesel fuel, Bunker C oil and kerosene;

(b) introducing preheated oxidic ore selected from the group consisting of the oxidic ores of iron, tungsten, nickel, zinc and copper into said preheated reducing zone;

(c) introducing said hydrocarbon fuel into said preheated reducing zone in the absence of sufficient oxidant to support the combustion thereof;

(d) admixing said ore and said fuel to react said ore with said fuel whereupon said fuel is thermally and catalytically reformed by the action of said ore in said heat and said ore is deoxidized by the action of said reformed fuel;

(e) passing said fuel from said reducing zone directly into a heating zone circumscribing and rotatable with said reducing zone;

(f) introducing secondary air into said heating zone to ignite said fuel and support the combustion thereof in said heating zone, said combustion providing sufficient heat to maintain at least a portion of said reducing zone at a temperature above the equilibrium temperature of said ore;

(g) passing burned gases from said heating zone through a supply of oxidic ore to preheat and dry said ore for introduction into said reducing zone; and (h) discharging reduced ore from said reducing zone.

8. The method of reducing oxidic ores comprising:

(a) preheating a reducing zone to a temperature sufficient to effect the chemical reformation of a hydrocarbon fuel selected from the group consisting of aliphatic hydrocarbons, diesel fuel, Bunker C oil and kerosene;

(b) introducing preheated oxidic ore of an element selected from the group consisting of iron, tungsten, nickel, zinc and copper into said preheated reducing zone;

(c) introducing said hydrocarbon fuel into said preheated reducing zone in the absence of sufficient oxidant to support the combustion thereof;

(d) tumbling said ore and said fuel to intermix said ore with said fuel whereupon said fuel is thermally and catalytically reformed by the action of said ore in said heat and said ore is deoxidized by the action of said reformed fuel;

(e) passing said fuel from said reducing zone directly into a heating zone circumscribing and rotating with said reducing zone;

(f) introducing a controlled amount of secondary air into said heating zone along the length thereof to ignite said fuel and support the combustion thereof in said heating zone, said combustion providing sufficient heat to maintain a portion of said reducing zone at a temperature above the equilibrium temperature of said oxidic ore;

(g) passing burned gases from said heating zone through a supply of oxidic ore to preheat and dry said ore for introduction into said reducing zone; and (h) discharging reduced ore from said reducing zone.

9. The method of reducing oxidic ore including admixing an ore selected from the group consisting of the oxidic ones of iron, tungsten, nickel, zinc and copper with a hydrocarbon fuel in a heated rotatable reducing zone without combustion; surrounding said reducing zone with a heating zone which is rotatable therewith; passing said uncombusted hydrocarbon fuel from said reducing zone directly into said heating zone causing the combustion of said uncombusted fuel in said heating zone; and selectively aspirating air along said heating zone to heat and control the temperature of said reducing zone.

10. The method of reducing an ore selected from the group consisting of the oxidic ores of iron, tungsten, nickel, zinc and copper comprising: establishing a rotatable reducing zone; surrounding said reducing zone with a heating zone which is rotatable therewith; admixing said ore with a hydrocarbon fuel; heating said admixture in said reducing zone without combustion; passing uncombusted fuel from said reducing zone directly into said heating zone; introducing secondary air into said heating zone to support the combustion of said fuel; and burning said fuel in said air in said heating zone while simultaneously rotating said zones and heating said admixture in said reducing zone.

11. The method of reducing an ore selected from the group consisting of the oxidic ores of iron, tungsten, nickel, zinc and copper comprising; establishing a rotatable reducing zone; surrounding said reducing zone with a heating zone which is rotatable therewith; introducing said ore into said reducing zone; introducing a hydrocarbon fuel into said reducing zone; admixing said ore with said hydrocarbon fuel in said reducing zone without combustion of said fuel; passing said uncombusted fuel from said reducing zone directly into said heating zone; selectively introducing secondary air into said heating zone; mixing said air with said uncombusted fuel from said reducing zone to form an air-fuel mixture; and burning said air-fuel mixture in said heating zone while rotating said zones whereby said admixture in said reducing zone is simultaneously heated.

12. The method of reducing an ore selected from the group consisting of the oxidic ores of iron, tungsten, nickel, zinc and copper comprising: establishing a reducing zone circumscribed by a heating zone and rotatable therewith; introducing an admixture of said ore and a hydrocarbon fuel into said reducing zone while simultaneously passing uncombusted fuel from said reducing zone directly into said heating zone; and burning said fuel in said heating zone while rotating said zones whereby said admixture in said reducing zone is heated without combustion occurring therein.

References Cited in the file of this patent

UNITED STATES PATENTS

| | | |
|---|---|---|
| 1,595,454 | Christ | Aug. 10, 1926 |
| 1,785,428 | Smith | Dec. 16, 1930 |
| 1,829,438 | Coley | Oct. 27, 1931 |
| 2,131,665 | Jordan | Sept. 27, 1938 |
| 2,707,147 | Shapleigh | Apr. 26, 1955 |
| 2,948,525 | West et al. | Aug. 9, 1960 |